(12) United States Patent
Lamanna et al.

(10) Patent No.: US 11,588,865 B2
(45) Date of Patent: Feb. 21, 2023

(54) PEER-TO-PEER CONFERENCING SYSTEM AND METHOD

(71) Applicant: Technologies Crewdle Inc., Montreal (CA)

(72) Inventors: Vincent Lamanna, Carignan (CA); Farid Ait-Ouyahia, Montreal (CA); Pierre Campeau, Saint-Lambert (CA)

(73) Assignee: TECHNOLOGIES CREWDLE INC., Montreal (CA)

( * ) Notice: Subject to any disclaimer, the term of this patent is extended or adjusted under 35 U.S.C. 154(b) by 0 days.

(21) Appl. No.: 17/663,155

(22) Filed: May 12, 2022

(65) Prior Publication Data

US 2022/0377116 A1    Nov. 24, 2022

Related U.S. Application Data (60) Provisional application No. 63/191,661, filed on May 21, 2021.

(51) Int. Cl.
| | |
|---|---|
| *H04L 65/403* | (2022.01) |
| *H04L 65/1108* | (2022.01) |
| *H04L 45/302* | (2022.01) |
| *H04L 65/80* | (2022.01) |

(52) U.S. Cl.
CPC ........ *H04L 65/403* (2013.01); *H04L 45/3065* (2013.01); *H04L 65/1108* (2022.05); *H04L 65/80* (2013.01)

(58) Field of Classification Search
None
See application file for complete search history.

(56) References Cited

U.S. PATENT DOCUMENTS

| | | | |
|---|---|---|---|
| 2016/0373697 A1 | 12/2016 | Avni et al. | |
| 2018/0124140 A1* | 5/2018 | Jiang | ............... H04L 65/1069 |
| 2020/0211720 A1* | 7/2020 | Goldberg | ............... G16H 10/60 |

FOREIGN PATENT DOCUMENTS

| | | | | |
|---|---|---|---|---|
| CN | 109327727 A | * | 2/2019 | ............. G06F 21/16 |
| EP | 3399713 A1 | * | 11/2018 | ....... H04L 29/06176 |
| WO | 2006116659 A2 | | 11/2006 | |
| WO | 2015095752 A1 | | 6/2015 | |
| WO | 2021086478 A1 | | 5/2021 | |

OTHER PUBLICATIONS

International Search Report dated Oct. 25, 2020, from the corresponding International application No. PCT/CA2022/050756.

* cited by examiner

*Primary Examiner* — Jeffrey R Swearingen
(74) *Attorney, Agent, or Firm* — Brouillette Legal Inc.; Robert Brouillette (57) ABSTRACT

A system and method for transferring content streams in a peer-to-peer network is provided. The system may first process and manipulate, through resizing, compression and frame limitations, a source content stream through a stream processor and into a destination canvas before being sent to a peer connection. The source content may be manipulated differently for a plurality of peer connections through associated stream processors. The system may further dynamically connect to a plurality of peers of a network and requests a list of requirements for selecting a preferable stream broadcaster. The selection may use the bandwidth available for streaming and the geolocation of the participants.

8 Claims, 7 Drawing Sheets

PEER-TO-PEER CONFERENCING SYSTEM AND METHOD

CROSS-REFERENCE TO RELATED APPLICATIONS

The present patent application claims the benefits of priority of U.S. Patent Application No. 63/191,661, entitled "PEER-TO-PEER CONFERENCING SYSTEM AND METHOD", and filed at the United States Patent and Trademark Office on May 21, 2021, the content of which is incorporated herein by reference.

FIELD OF THE INVENTION

The present invention generally relates to videoconferencing systems and methods, and more particularly in system and methods of manipulating content streams in peer-to-peer networks to increase the numbers of participants in a videoconference over peer-to-peer networks.

BACKGROUND OF THE INVENTION

Figure 1:
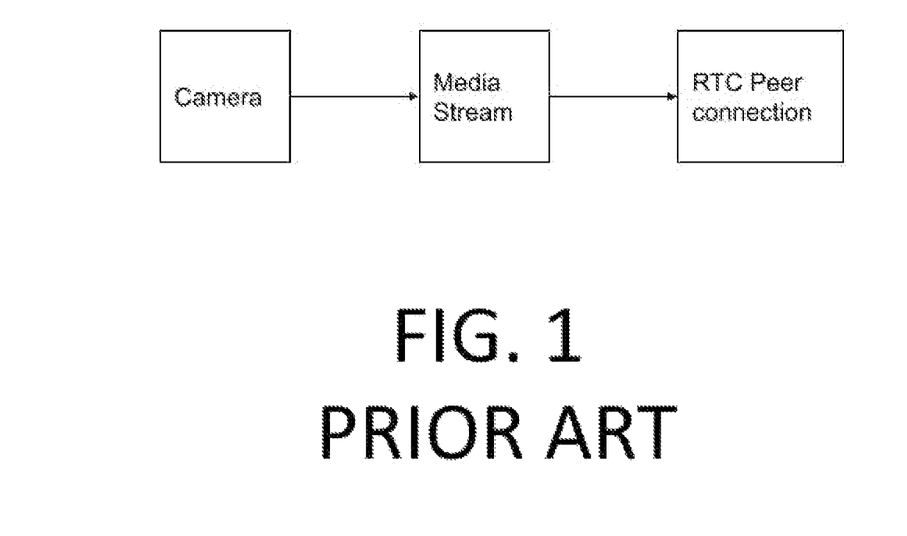
FIG. 1 is a flow diagram of a prior art method to stream video data over a RTC peer connection.

When transferring a content stream from a user to another user over a peer-to-peer network, the content of the stream is generally communicated as a media stream over a real-time communication (RTC) peer-to-peer connection. As shown in FIG. 1, a camera captures a video or series of images, the captured video is fed as a media stream to the RTC peer-to-peer connections. As the content stream may not be processed nor manipulated in real time as the WebRTC does not provides access to the said stream.

Figure 2:
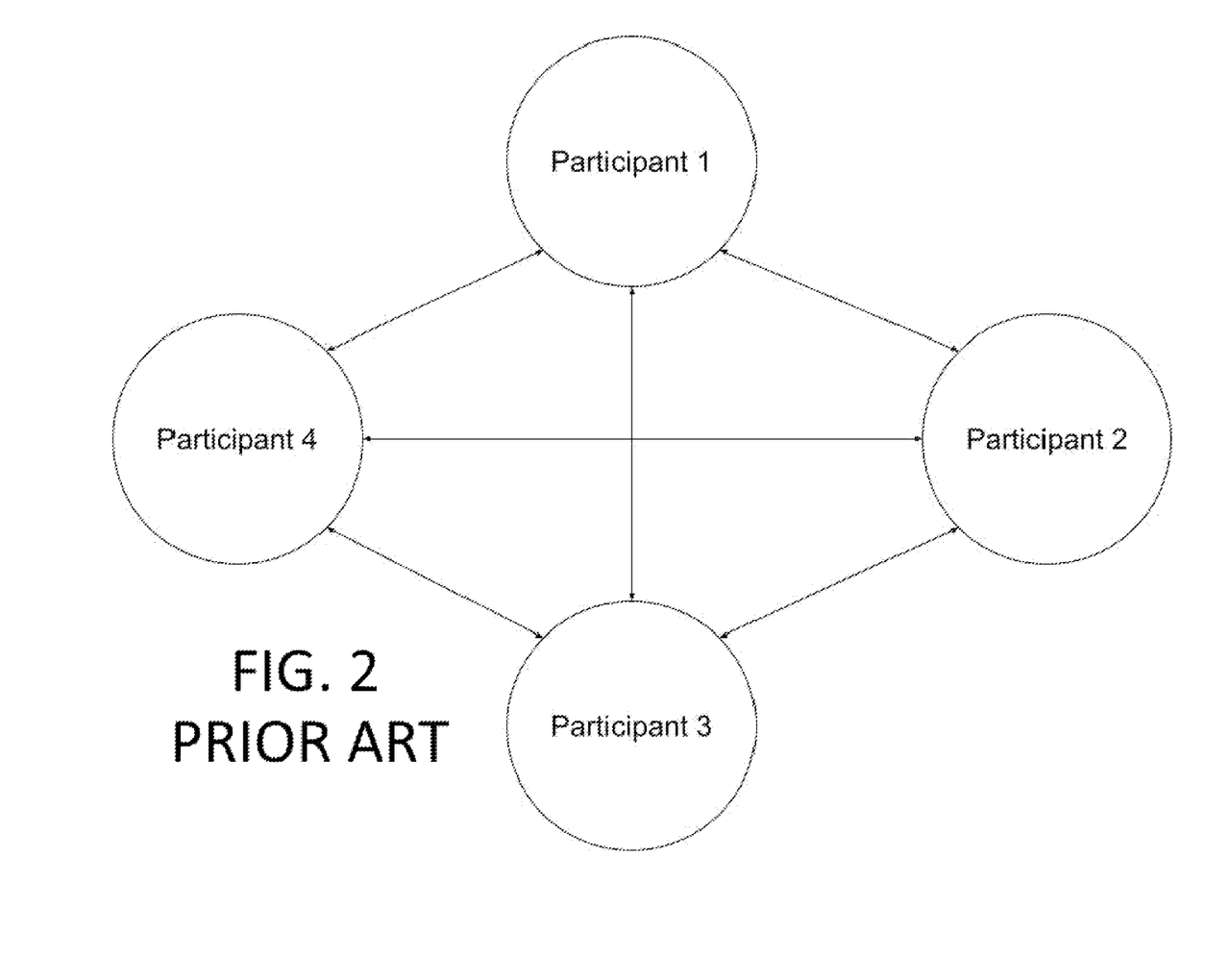
FIG. 2 is a diagram of connections between participants using a prior art peer-to-peer videoconferencing system.

Referring to FIG. 2, a diagram of connections between participants of a typical prior art peer-to-peer videoconference system is shown. In such system, one connection for both downloading and uploading is established between each of the participants of the peer-to-peer network. As the number of participants increase, the required number of connections exponentially increases. Therefore, the required bandwidth required to stream the videoconference between the participants shall also increase exponentially. One of the main drawbacks of such prior art system is that any user sending a video stream will be the bottleneck to the videoconference streaming.

Accordingly, there is a need for novel peer-to-peer videoconferencing system allowing an increased number of participants over prior art systems.

SUMMARY OF THE INVENTION

The aforesaid and other objectives of the present invention are realized by generally providing a computer system for processing a content stream in a peer-to-peer video conferencing system, the system comprising: a stream handler transferring the content stream to a source canvas; at least one real-time communication (RTC) peer connection between at least one stream processor and a computerized device participating in a peer-to-peer video conference; the least one stream processor being configured to: access that content is present in the source canvas; process the accessed content; and transfer the processed content to at least one destination canvas; and push the content present in the destination canvas to each of the RTC peer connection. The stream processor may be configured to transfer the content stream to the source canvas at a predetermined frequency. The predetermined frequency may be a function of bandwidth available between the content stream and the one or more RTC peer connections. The one or more stream processors may access the content from the source canvas at the predetermined frequency.

In another aspect, the processing of the accessed content for each of the one or more stream processors may comprise manipulating the accessed content. The manipulation of the accessed content may further comprise compressing, resizing and altering the frame rate of the accessed content. The processing and manipulating of the accessed content may be adapted in real-time as a function of changes in requirements of the one or more RTC peer connections.

In another aspect, the push of the processed content to the RTC peer connections from the one or more destination canvases may be performed through media or data channels. The source canvas may be an HTML canvas. The stream processor may use a WebRTC framework.

In yet another aspect, a computer-implemented method for processing and manipulating a content stream in a peer-to-peer video conferencing system is provided, the method comprising: transferring the content stream from a stream handler to a source canvas; at least one stream processor accessing content present in the source canvas; the stream processor processing and manipulating the accessed content; the stream processor transmitting the processed and manipulated content to one or more destination canvases; and pushing the processed and manipulated content of the one or more destination canvases to one or more real-time communication (RTC) peer connections between computerized devices participating in a peer-to-peer video conference. The manipulation of the accessed content may comprise compressing, resizing and altering the frame rate of the accessed content.

In yet another aspect, a computer-implemented method of transferring a content stream to participant computerized devices of a peer-to-peer network is provided, the method comprising: a requesting computerized device establishing a RTC peer connection with each of the participant computerized devices; the requesting computerized device broadcasting a message to all the participant computerized devices; each of the participant computerized devices providing fulfillment information to the requesting participant device indicating if the content stream of the participant computerized device may be streamed to the requesting computerized device; the requesting computerized device connecting with the participant computerized device having a satisfactory level of fulfillment based on the received fulfillment information; the connected participant computerized device transferring the content stream to the requesting participant device.

In another aspect, the broadcasted message may comprise minimal requirements for transferring the content stream to the requesting computerized device. The fulfillment information may comprise a level of fulfillment for transferring the content stream associated with the participant computerized device providing the fulfillment information. The fulfillment information may comprise geolocalization information of the participant computerized device, the method further comprising the requesting computerized device connecting with the participant computerized device based on the received geolocalization information. The method may further comprise the requesting computerized device processing the received fulfillment information to determine the participant computerized devices having the highest level of fulfillment based on predetermined requirements. The predetermined requirements may comprise any of the followings: the available bandwidth, the latency, the geolocation coordinates and the number of hops in relation to the requesting computerized device.

In another aspect, the method may further comprise calculating an optimal route to one of the participant computerized devices in real-time and dynamically connecting to the participant computerized device associated with the optimal route to transfer the content stream. The method may further comprise: the requesting computerized device connecting to a plurality of participant computerized devices; simultaneously receiving the content stream of one of the participant computerized devices from a plurality of the connected participants computerized devices.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE INVENTION

A novel peer-to-peer conferencing system and method will be described hereinafter. Although the invention is described in terms of specific illustrative embodiment(s), it is to be understood that the embodiment(s) described herein are by way of example only and that the scope of the invention is not intended to be limited thereby.

Figure 3:
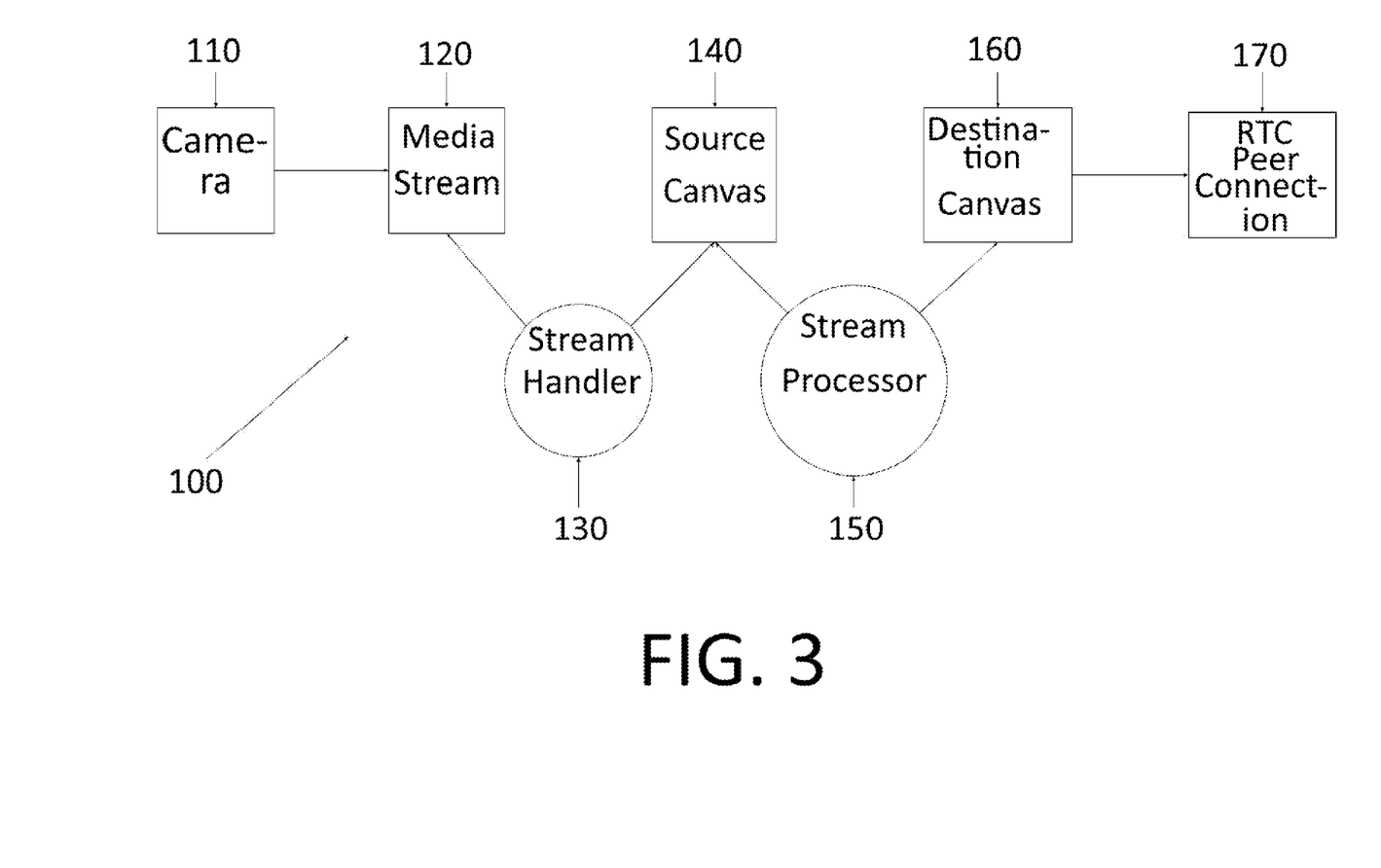
FIG. 3 is a data flow diagram of an embodiment of a peer-to-peer video conferencing system in accordance with the principles of the present invention.

Referring to FIG. 3, a data flow diagram of an exemplary peer-to-peer conferencing system 100 is shown. In some embodiments, a peer-to-peer client to the conferencing system 100 may be embodied as a web browser. In such embodiment, the conferencing system typically uses WebRTC framework for processing content streams. In other embodiments, the peer-to-peer client may be a native application, such as a desktop application, mobile application or any other type of application running on a specific computerized device.

As shown in FIG. 3, in a typical embodiment, a device 110 captures content, such as audio or video content. Broadly, the conferencing system 100 is configured to reduce bandwidth requirement for each participant of the network, both at the source and during the transmission, while providing the best quality of conferencing.

The capturing device 110 may be embodied as a camera, a microphone or any device incorporating the same, such as a mobile phone, a computer, etc. The capturing device 110 transforms the captured content into a content stream 120. The resulting content stream 120, generally a media or video stream, may be any type of content stream, such as data stream, audio stream, etc. The client device generally executes a stream handler 130 to process and manipulate the data stream 120. More particularly, the stream handler 130 dumps or transfers the content of the media stream 120 into a first canvas 140, also referred as the source canvas, such as but not limited to a HTML canvas, at a predetermined frequency, such as multiple times per second. For example, the predetermined frequency may be set at 30 frames per second. Understandably, the stream handler 130 may perform the dump operation at any predetermined frequency. The set frequency may be calculated as a function of the bandwidth available between the sending and receiving participants and/or of the size and complexity of the content to be streamed. One skilled in the art shall understand that any type of known source canvas may be used within the scope of the present invention.

The system 100 further comprises a stream processor 150 configured to access content of the source canvas 140. In one embodiment, the handler 130 may trigger the activation of the processor to access the content of the source canvas 140. The triggering of the processor is typically performed upon completing the dumping operation of the content in the source canvas 140. Understandably, any other methods known in the art may be used for the stream processor 150 to access the content of the source canvas only when the said content is present in the canvas 140, such as synchronization or notifications. Accordingly, the stream processor 150 is generally configured to read the content of the source canvas 140 at the same frequency of the dumping of the content in the source canvas 140 by the stream handler 130. The stream processor 150 may be further configured to read, process, and manipulate the fetched content of the source canvas 140. Upon reading, processing and/or manipulating the fetched content, the stream processor 150 dumps or copies the processed content to a second canvas 160, also referred as the destination canvas, such as but not limited to a HTML canvas.

The system 100 is further configured to push or copy the content stored in the destination canvas 160 to the RTC peer connection 170. Understandably, the stream of the destination canvas 160 to the peer connection 170 may be sent either using media channel, data channel or any other stream type known in the art.

Figure 4:
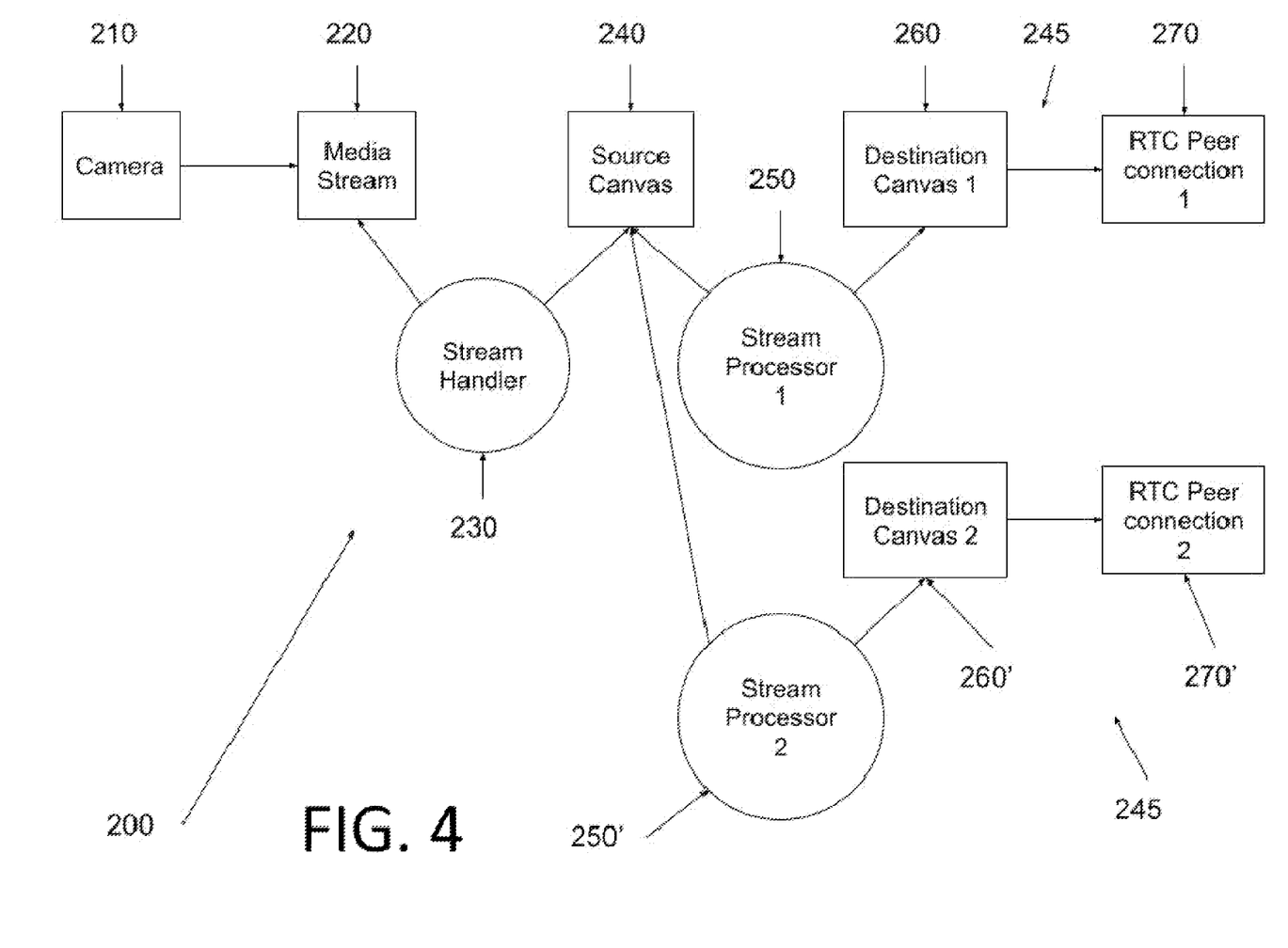
FIG. 4 is a data flow diagram of an embodiment of a peer-to-peer video conferencing system comprising more than one peer connection in accordance with the principles of the present invention.

Referring now to FIG. 4, another embodiment of a peer-to-peer conferencing system 200 is shown. The system 200 comprises a source content 210, a media stream 220, a stream handler 230 and a source canvas 240. Broadly, in such embodiment, the system 200 is configured to send, process, and manipulate content over two peer connections 270. In such embodiment, the system 200 comprises a stream processing system 245 for each of the peer connections 270. The stream processing systems 245 each generally comprises a stream processor 250 and a destination canvas 260. Thus, in the embodiment shown at FIG. 4, the system 200 comprises a second stream processor 250' in communication with a second destination 260'. Each additional stream processor is configured in a similar manner as to the above-described stream processor 250. As such, the additional stream processor 250' is configured to access or read the content from the first canvas or source canvas 240. The additional stream processor 250' may be configured to process and manipulate the content of the source canvas 240. As such, each of the stream processors 250, 250' may be configured to process and/or manipulate the content of the same source canvas 240 but in different manners. Similarly, in the present embodiment, the first and second destination canvas (260 and 260') may have different properties which may be adapted for different peer connections. For example, the second destination canvas 260' may be connected to a second peer connection 270' having a lower bandwidth than the first peer connection 270. Thus, the second stream processor 250' may be configured to perform further manipulations to compress, resize or alter the content stream of the source canvas 240 to optimize the streaming to the second peer connection 270'.

Figure 5:
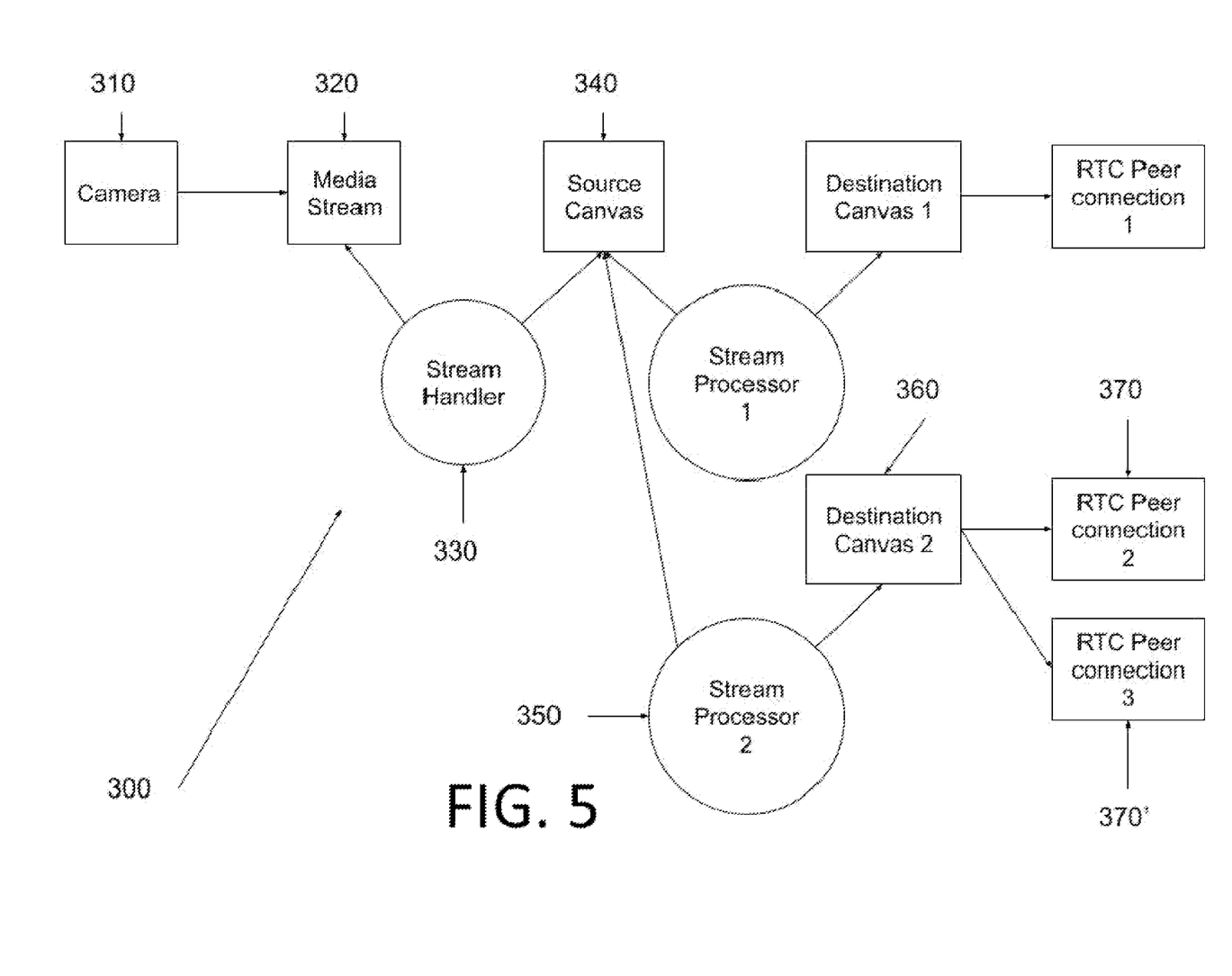
FIG. 5 is a data flow diagram of an embodiment of a peer-to-peer video conferencing system comprising with a stream processor comprising more than one peer connection in accordance with the principles of the present invention.

Referring now to FIG. 5, another embodiment of the system 300 is illustrated. The system 300 comprises a source 310, a media stream 320, a stream handler 330 and a source canvas 340. A destination canvas 360 may be linked or associated to more than one peer connection (370 and 370'). Furthermore, a destination canvas 360 may be connected up to n−1 peer connections 370, where n is the number of participants in a videoconference.

The processing and manipulation of the stream content by the stream processor 350 generally aims at reducing the required bandwidth for communicating the processed stream between the participants.

The processing may comprise video resizing. Resizing may comprise but is not limited to reducing the resolution and/or dimensions of the stream, varying the bit depth of each pixel of the stream, or any other method to resize the stream to reduce the data usage sent to the peer connection 370. As an example, the frames of a video may be 640 pixels by 480 pixels. As such, each frame may be resized to frames having 200 pixels by 180 pixels.

The processing may comprise compressing the stream or the video. The compression of the stream may comprise compressing each frame of a video or each packet of the data stream to reduce the bandwidth usage. As an example, the compressing may use a lossy compression algorithm which may help reducing the size of a video by 30 to 40% while retaining a good quality of video, the reduced quality being not or barely perceptible to a user. The content stream 320 may be compressed using web assembly and may be performed directly by a browser in embodiments using a browser as the client. Understandably, any other methods of compressing the stream content 340 known in the art may be used.

The processing may comprise reducing the frame rate. As an example, the content stream 320 dumped in the source canvas 340 may have a frame rate of 30 frames per second. In such an example, the stream processor 350 is configured to reduce the frame rate to 15 frames per second. Having a reduced frame rate of the stream generally allows reducing the required bandwidth. Understandably, any other known processing methods or combinations of methods to optimize the content stream 320 to be dumped in the second canvas 360 may be used within the scope of the present invention. When combining all the above-mentioned methods aiming at reducing the size of the content stream 320, reductions of up to 70 to 80% of the initial size of the unprocessed content stream 320 may be envisioned.

In yet another embodiment, the stream processor 350 may be configured to dynamically select or to apply different parameters to the processing or manipulation of content stream 320 based on changing requirements of the peer connection 370. As an example, if the available bandwidth of a peer connection 370 varies in time, the stream processor 350 may determine the current available bandwidth and may adjust the processing applied to the stream content 320 on the read stream content of the source canvas 340 according to the said current available bandwidth. Understandably, in events where the bandwidth is greatly increased, the stream processor 350 may forward the stream content 320 from the source canvas 340 to the destination canvas 360 without any processing or manipulation or with minimal processing or manipulation. In events where the bandwidth is reduced, the stream processor 350 may further increase the level of processing or manipulation of the stream content 320 fetched from the first canvas 340 to further reduce the required bandwidth on the peer connection 370.

Peer-to-peer connections are generally considered safer against unwanted external access to the streamed content when compared to conferencing systems using a multipoint control unit. However, and in order to increase the security of the network, in some embodiments, the stream processor 350 or the stream handler 330 may be further configured to encrypt the stream content 320. In such embodiments, the receiving client or system shall comprise a stream handler 330 or one or more stream processors 350 configured to decrypt an encrypted content stream 320. In some embodiments, the received encrypted content stream 320 may be produced by a capturing device 310 wherein other embodiments, it may be received from a peer connection to another participant. Encrypting the media stream 320 using methods known in the art may be especially useful in high security settings such as medical, defense, aerospace, etc.

Figure 6:
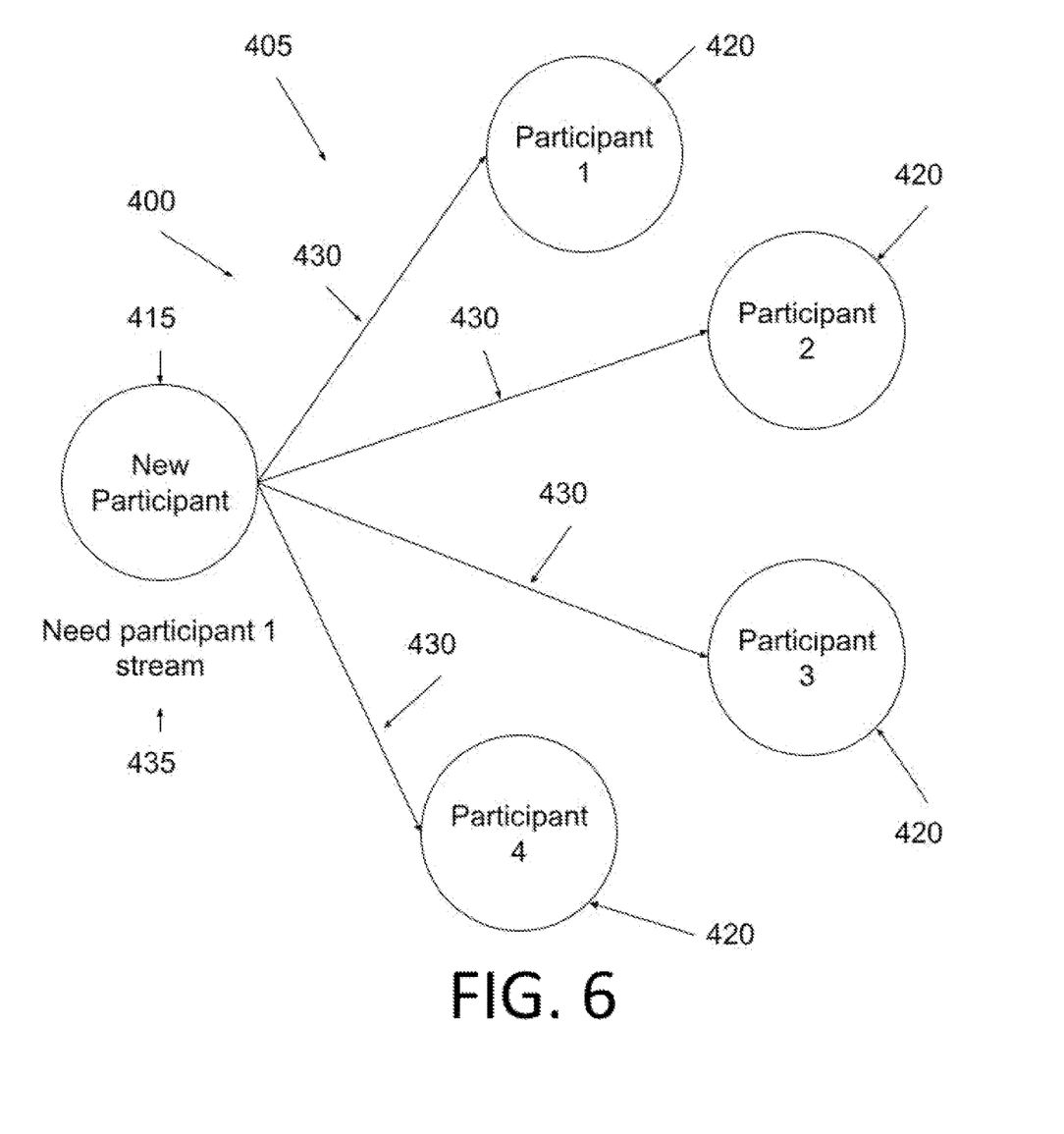
FIG. 6 is a data flow diagram of a new participant broadcasting a message to other participants in an embodiment of peer-to-peer network video conferencing system in accordance with the principles of the present invention.
Figure 7:
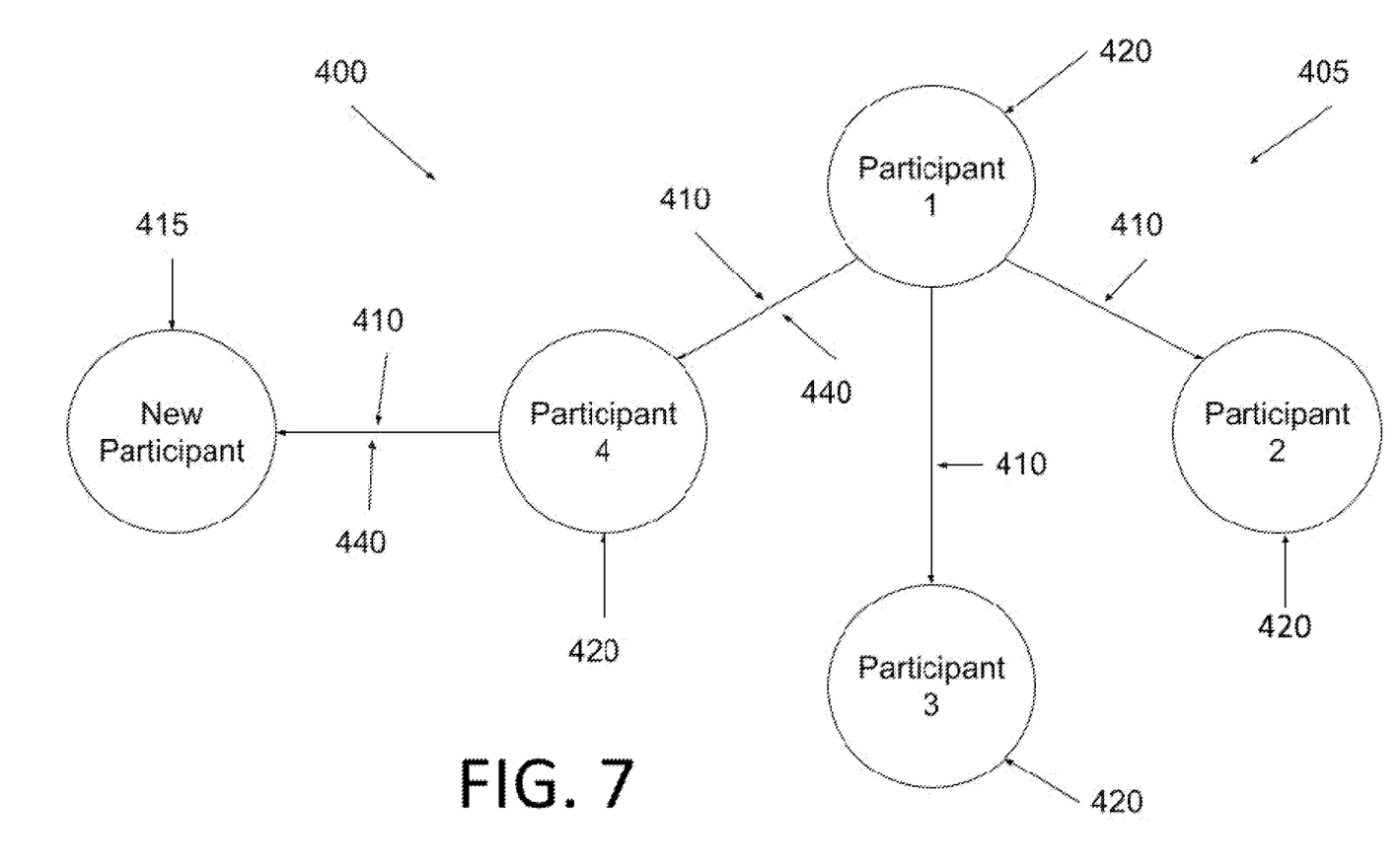
FIG. 7 is a data flow diagram of a peer-to-peer video conferencing system sharing one or more media streams between participants in accordance with the principles of the present invention.

Now referring to FIGS. 6 and 7, a system and method 400 for peer-to-peer subscription broadcasting is illustrated. Broadly, the embodied system and method 400 dynamically feed content streams 410 to participants 420 of a peer-to-peer network 405. The method 400 generally comprises establishing an RTC peer connection 430 between each participant 420 involved in the conference upon a new participant 415 requesting or entering the videoconference network. In some embodiments, the request 430 may be directly sent to each of the other participants 420. In other embodiments, the request 430 may be sent indirectly from one of the participants 420 to another participant 420 on behalf of the new participant 415.

Once a connection 430 is established with each of the participants 420 of the peer-to-peer network 405, the client of the new participant 415 broadcasts a message 435 to all other participants 420 requesting the stream 410 of one or more participants 420. The broadcasted message 435 generally comprises the requirements for streaming to the new participant 415. As an example, the requirements may comprise the video size, the compression level or compression algorithm used, the video frame rate, the bit depth, etc. Typically, the broadcast request 435 comprises a maximal bandwidth or maximal and minimal bandwidth levels of the requested stream 410.

Upon receipt of the broadcasted message 435, each participant 420 may send a reply 440 to the client device of the new participant 415 indicating if the stream 410 of the requested participant 420 may be streamed to the new participant 415 according to the requirements. Broadly, a client device of a participant 420 having enough bandwidth will send a reply 440 being able to fulfill the request. In some embodiment, the reply 440 of the client devices of the participants 420 may further comprise the level of fulfillment for which the replying device is able to stream the video of the requesting participant 415. The fulfillment level may be the maximum level or any other predetermined threshold level. In events where no participant 420 may fulfill the requested stream at the requested bandwidth, the participant 420 being able to fulfill the request the closest to the requirements may be selected.

In a further embodiment, the reply 440 of the client devices of the participants 420 may comprise the geolocation coordinates of the participants 420. In such embodiments, the geolocation of the participants 420 may be taken into consideration when selecting the route to stream the video or data. Using geolocation for choosing a participant 420 to establish an RTC peer connection may thus minimize the latency of the stream 410 to provide a better experience for the receiving user 415.

The client device of the new participant 415 is configured to analyze the replies 440 received from the devices of the other participants 420. The analyzing process determines which of the participants 420 is best suited to provide the streamed content 410 based on different requirements. The requirements may be, but are not limited to, the availability of a stream, the available bandwidth, the latency, the geolocation and/or the number of hops in relation to the relay. The client device is further configured to subscribe to the streaming of the selected participant 420 to receive the requested video stream 410.

In the illustrated embodiment, the new participant 415 requests the stream 410 of participant 1 by submitting a broadcast message 430 to participants 1 to 4. The new participant 415 receives replies 440 from each of the participants 1 to 4 and analyzes the received replies 440. Based on the requirements and the information provided in the replies 440, the new participant 415 calculates that the content stream 410 shall be provided by participant 4. Thus, the new participant 415 shall subscribe to participant 4 to retrieve the stream 410 of participant 1.

If a participant 420 providing a content stream 410 to another participant 420 leaves or disconnects from the peer network 405 or is unable to provide the required stream content 410 at the agreed requirements, the subscribed participants 420 may repeat the process 400 of broadcasting and deciding of a new stream provider amongst the devices of the remaining participants 420.

In other embodiments (not shown), more than one participant 420 forwards the stream 410 of a participant 420 streaming a video. In such embodiments, the system 400 shall dynamically adapt to the routes and/or calculates the optimal routes for transmitting content streams 410.

It may be appreciated that with each participant 420 possibly acting as a source for processing and manipulating a stream 410 of any of the other participants 420, the load requirement for processing and manipulating the stream content 410 suitable for each of the requesting participants 420 may be significantly reduced. It is especially advantageous when compared to other conventional peer-to-peer network where each of the participants 420 is the source of the content stream 410 and manipulates said content stream 410. The processing and manipulation of the content stream 410 may also be distributed amongst the stream processors of the client devices of the participants 420. As an example, as shown at FIG. 7, the stream processor of participant 1 processes the content stream 410 using one or more optimization as discussed above. As such, in some embodiments, the content stream bandwidth may be reduced by a proportion of about 50% of the original captured stream. The content stream 410 received by the participant 4 from the participant 1 may further be optimized by the client device of participant 4 before being streamed to the new participant 415. Thus, in some embodiments, the bandwidth may be reduced by around 75% of its initial size. As such, the workload associated with the processing and/or manipulation may be distributed amongst the participants (415 and 420) of the peer-to-peer network 405. As a result, the conference system 400 may comprise a high number of participants 420 in the network 405 without significant performance reduction. For example, using other conventional peer-to-peer systems, a participant having a bandwidth of 10 Mb/s may typically stream a video media to four (4) other users (about 2.5 Mb/s per user). In some embodiments of the present invention, a participant having a bandwidth of 10 Mb may stream a video stream to up to sixteen (16) other users (about 0.625 Mb per user).

In another embodiment, instead of receiving the stream 410 of a participant 420 from a single broadcast, the client device of a participant 420 may be connected to multiple broadcasts 410 of the same participant 420. In such embodiment, the client device simultaneously receives the stream 410 of the same participant 420 from a plurality of sources, the sources being other participants 420. Accordingly, in the event where a participant 420 is acting as an intermediate or as a relay quits the videoconference 405, no or only a minimal downtime, cut of stream or significant loss of quality may occur. Indeed, when the intermediate participant 420 quits the meeting, the receiving participant 420 switches to another route or to another source of the same content stream 410. It may especially be useful in fields requiring constant and uninterrupted stream connections such as medical, defense, aerospace and financial.

By combining the video manipulation methods (100, 200, or 300) of the system with the dynamically adapting peer-to-peer network (400) as recited above, the resulting system may support a high number of participants 420 in one virtual meeting room without the drawbacks of a conventional multipoint control unit.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

The invention claimed is:

1. A computer-implemented method of transferring a content stream to participant computerized devices of a peer-to-peer network, the method comprising:
    a requesting computerized device establishing a RTC peer connection with each of the participant computerized devices;
    the requesting computerized device broadcasting a message to all the participant computerized devices;
    each of the participant computerized devices providing fulfillment information to the requesting participant device indicating if the content stream of the participant computerized device may be streamed to the requesting computerized device;
    the requesting computerized device connecting with the participant computerized device having a satisfactory level of fulfillment based on the received fulfillment information;
    the connected participant computerized device transferring the content stream to the requesting participant device.

2. The method of claim 1, the broadcasted message comprising minimal requirements for transferring the content stream to the requesting computerized device.

3. The method of claim 1, the fulfillment information comprising a level of fulfillment for transferring the content stream associated with the participant computerized device providing the fulfillment information.

4. The method of claim 1, the fulfillment information comprising geolocalization information of the participant computerized device, the method further comprising the requesting computerized device connecting with the participant computerized device based on the received geolocalization information.

5. The method of claim 1, further comprising the requesting computerized device processing the received fulfillment information to determine the participant computerized devices having the highest level of fulfillment based on predetermined requirements.

6. The method of claim 5, the predetermined requirements comprising any of the followings: the available bandwidth, the latency, the geolocation coordinates and the number of hops in relation to the requesting computerized device.

7. The method of claim 1, further comprising calculating an optimal route to one of the participant computerized devices in real-time and dynamically connecting to the participant computerized device associated with the optimal route to transfer the content stream.

8. The method of claim 1, further comprising:
- the requesting computerized device connecting to a plurality of participant computerized devices;
- simultaneously receiving the content stream of one of the participant computerized devices from a plurality of the connected participants computerized devices.

* * * * *